United States Patent
Inoue

(10) Patent No.: US 7,543,165 B2
(45) Date of Patent: Jun. 2, 2009

(54) NETWORK DEVICE, POWER SAVING MODE PROCESSING METHOD, STORAGE MEDIUM STORING COMPUTER PROGRAMS, AND PROGRAMS

(75) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 11/385,402

(22) Filed: Mar. 21, 2006

(65) Prior Publication Data

US 2006/0218440 A1    Sep. 28, 2006

(30) Foreign Application Priority Data

Mar. 28, 2005  (JP)  .............................. 2005-090503
Mar. 2, 2006   (EP)  .................................. 06251134

(51) Int. Cl.
  G06F 1/00   (2006.01)
  G06F 1/32   (2006.01)
  G06F 11/00  (2006.01)
  G06F 15/177 (2006.01)

(52) U.S. Cl. ........................ 713/300; 713/320; 713/324; 713/330; 714/100; 714/1; 714/15; 709/220; 709/222

(58) Field of Classification Search ................. 713/300, 713/320, 324, 330; 714/100, 1, 15; 709/220, 709/222

See application file for complete search history.

(56) References Cited

U.S. PATENT DOCUMENTS

| 6,002,918 | A   |   | 12/1999 | Heiman |
| 6,282,665 | B1  | * | 8/2001  | Cruz .......................... 713/320 |
| 7,280,853 | B2  | * | 10/2007 | Hassan et al. ............... 455/574 |
| 2005/0044430 | A1 | * | 2/2005 | Cheshire ..................... 713/300 |
| 2006/0265473 | A1 |   | 11/2006 | Muto |

FOREIGN PATENT DOCUMENTS

| EP | 1122712 A1 | 8/2001 |
| JP | 2003-191570 A | 7/2003 |
| JP | 2004-334793 A | 11/2004 |

* cited by examiner

*Primary Examiner*—Thomas Lee
*Assistant Examiner*—Michael J Brown
(74) *Attorney, Agent, or Firm*—Canon U.S.A., Inc. I.P. Division

(57) ABSTRACT

A method for controlling a network device includes a receiving step of receiving a data packet complying with a predetermined protocol via a network, a setting step of setting recovery conditions corresponding to the protocol of the received data packet, and a recovering step of recovering the network device from a power saving condition according to the recovery conditions set in the setting step.

21 Claims, 18 Drawing Sheets

| SERVICE MENU | CORRESPONDING PACKET |
|---|---|
| NOT ACTIVATED BY NETWORK PACKET | INVALIDATE ALL RECOVERY PACKETS |
| ACTIVATED BY START-ONLY PACKET | START-ONLY PACKET → ON |
| ACTIVATED BY PRINT JOB PACKET | ARP, MAC ADDRESS → ON |
| ACTIVATED BY UTILITY SERVICE PACKET | SLP, SNMP → ON |

FIG.11

| SL SLEEP LEVEL | SJ SERVICE MENU | START-ONLY PACKET | ARP | MAC ADDRESS | SLP | SNMP |
|---|---|---|---|---|---|---|
| 4 | NOT ACTIVATED BY NETWORK PACKET | × | × | × | × | × |
| 3 | ACTIVATED BY START-ONLY PACKET | ○ | × | × | × | × |
| 2 | ACTIVATED BY PRINT JOB PACKET | ○ | ○ | ○ | × | × |
| 1 | ACTIVATED BY UTILITY SERVICE PACKET | ○ | ○ | ○ | ○ | ○ |

FIG.18

FD/CD-ROM OR OTHER STORAGE MEDIUM

| DIRECTORY INFORMATION |
|---|
| FIRST DATA PROCESSING PROGRAM INCLUDING PROGRAM CODES CORRESPONDING TO STEPS OF FLOWCHART SHOWN IN FIG. 3 |
| SECOND DATA PROCESSING PROGRAM INCLUDING PROGRAM CODES CORRESPONDING TO STEPS OF FLOWCHART SHOWN IN FIG. 9 |
| THIRD DATA PROCESSING PROGRAM INCLUDING PROGRAM CODES CORRESPONDING TO STEPS OF FLOWCHART SHOWN IN FIG. 10 |
| FOURTH DATA PROCESSING PROGRAM INCLUDING PROGRAM CODES CORRESPONDING TO STEPS OF FLOWCHART SHOWN IN FIG. 16 |
| FIFTH DATA PROCESSING PROGRAM INCLUDING PROGRAM CODES CORRESPONDING TO STEPS OF FLOWCHART SHOWN IN FIG. 17 |
| |

MEMORY MAP OF STORAGE MEDIUM

NETWORK DEVICE, POWER SAVING MODE PROCESSING METHOD, STORAGE MEDIUM STORING COMPUTER PROGRAMS, AND PROGRAMS

BACKGROUND OF THE INVENTION

1. Field of the Invention

The present invention relates to a power saving mode control performed in a network device that is connected to a network environment and has a predetermined power saving mode function.

2. Description of the Related Art

Various network devices including business machines are generally required to reduce electric power consumption from the viewpoint of protecting global environments as well as saving valuable energy sources.

To attain this goal, a conventional network device, such as a digital multi function peripheral, can be automatically controlled to turn its operation into a power saving mode when a predetermined time has passed during a standby condition where the device performs nothing. In the power saving mode, no electric power is supplied to functional sections (e.g., a printing section, a reading section, a display section, and a control section) in the apparatus.

Furthermore, if any packet instructing a normal operation mode is received via a network, the device can return its operation to the normal operation mode while canceling the power saving mode.

The present multi-functionalized network techniques can transmit a large number of packets to each network device. Thus, the network devices may unnecessarily cancel the power saving mode in response to an improper packet. In other words, the network devices cannot maintain the power saving mode for a sufficient time and accordingly cannot reduce electric power consumption as expected. In this respect, some of incoming packets invalidate or weaken the power saving mode function of the network devices.

Hence, the network devices can include a filtering section that can determine whether each incoming packet signal is unnecessary. Furthermore, the network devices can abandon all of unauthorized packets. For example, broadcast packets can be selectively abandoned if predetermined conditions are satisfied. The packets including a specific protocol can be automatically abandoned (refer to Japanese Patent Application Laid-open No. 2003-191570). However, the above-described conventional power saving control techniques for the network devices are so specialized or complicated that many users cannot correctly designate the protocol type.

Furthermore, in consideration of the necessity of protecting the global environments as well as reducing the electric power consumption, many users want to customize the network devices to have an enhanced power saving function robust against improper or unnecessary packets transmitted via the network.

SUMMARY OF THE INVENTION

The present invention is directed to a network device that enables even an unskilled user to enhance power saving effects considering a protocol of received data.

One aspect of the present invention provides a network device including a receiving unit, a setting unit, and a recovering unit. The receiving unit receives a data packet complying with a predetermined protocol via a network. The setting unit sets recovery conditions corresponding to the protocol of the received data packet. And, the recovering unit recovers the network device from a power saving condition according to the recovery conditions set by the setting unit.

Another aspect of the present invention provides a method for controlling a network device, including: a receiving step of receiving a data packet complying with a predetermined protocol via a network; a setting step of setting recovery conditions corresponding to the protocol of the received data packet; and a recovering step of recovering the network device from a power saving condition according to the recovery conditions set in the setting step.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 11 is a view showing one example of a table showing second recovery conditions stored in the controller unit shown in FIG. 1.

FIG. 18 is a view showing a memory map of a storage medium that can store various data processing programs readable by the network device of the present invention.

DETAILED DESCRIPTION OF THE EXEMPLARY EMBODIMENTS

Figure 1:
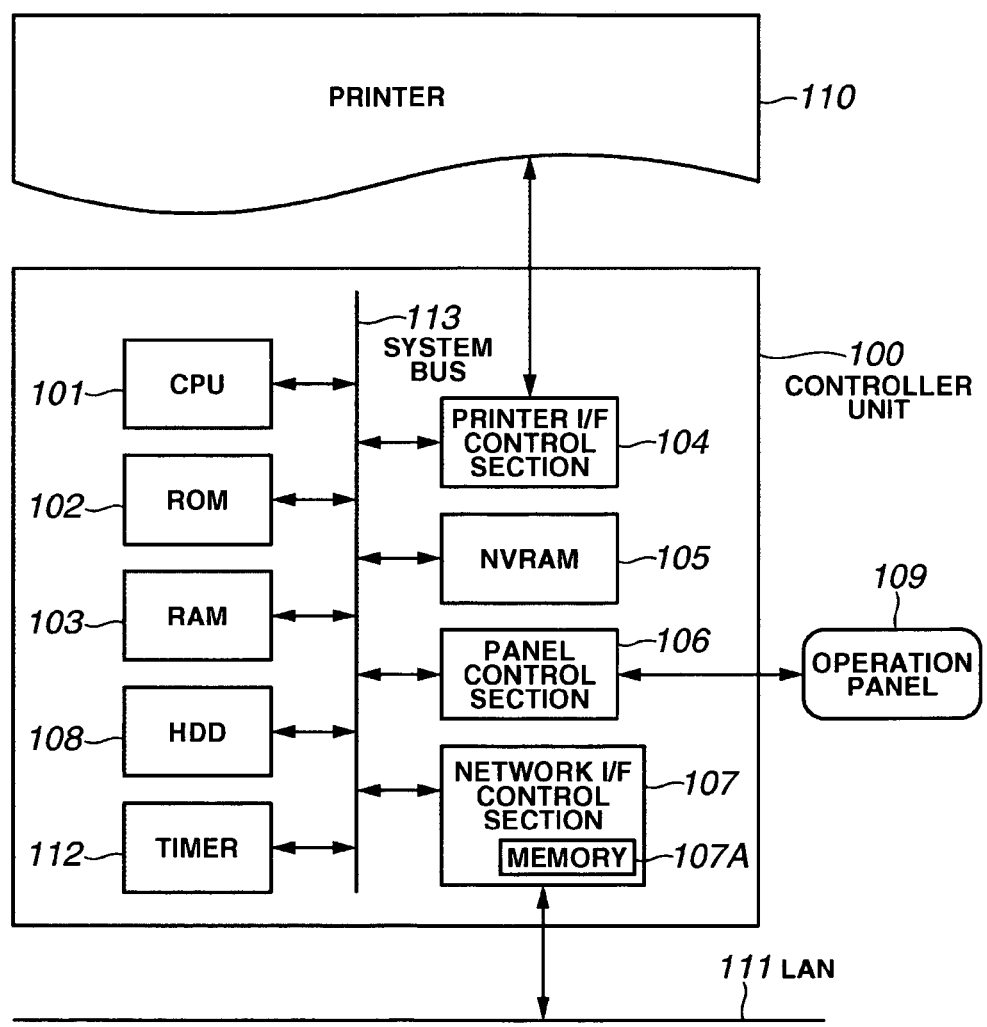
FIG. 1 is a block diagram showing an arrangement of an image processing apparatus in accordance with a first exemplary embodiment of the present invention.

The following description of exemplary embodiments is merely illustrative in nature and is in no way intended to limit the invention, its application, or uses. Exemplary embodiments can be incorporated into various image processing systems (e.g., monochrome printers, color printers, multi function peripherals as known by one of ordinary skill, and equivalents) or other network systems.

Processes, techniques, apparatus, and materials as known by one of ordinary skill in the art may not be discussed in detail but are intended to be part of the enabling description where appropriate. Additionally, exemplary embodiments can be used with non-digital systems as well as digital systems. Notice that similar reference numerals and letters refer to similar items in the following figures, and thus once an item is defined in one figure, it may not be discussed or further defined in the following figures.

Exemplary embodiments of the invention will be described in detail below with reference to the drawings.

First Exemplary Embodiment

FIG. 1 is a block diagram showing an arrangement of an image processing apparatus in accordance with a first exemplary embodiment of the present invention. The image processing apparatus can function as a network device and includes a controller unit 100, a printer 110, and an operation panel 109.

The controller unit 100 includes a CPU 101, a ROM 102, a RAM 103, a printer I/F control section 104, a NVRAM 105, a panel control section 106, a network I/F control section 107, a HDD 108, a timer 112, and a system bus 113. The CPU 101 executes software programs of the network device and controls the entire apparatus. The ROM 102 is a read only memory that can store a boot program or other programs of the apparatus as well as fixed parameters. The RAM 103 is a random access memory that can temporarily store various control data for the CPU 101.

The HDD 108 is a hard disk drive that can store various data including printing data for each host computer and for each user. The timer 112 can measure the time elapsed in the timer processing. The printer I/F control section 104 can control the printer 110 (i.e., an engine). The NVRAM 105 is a nonvolatile memory that can store various setting values for the network device, including various printing modes that a user can select through the operation panel 109.

The panel control section 106 can control the operation panel 109 to display various information or data and allow a user to input various instructions. The network I/F control section 107 can control data communications performed between the controller unit 100 and a LAN 111. A memory 107A incorporated in the network I/F control section 107 can store recovery conditions to be executed according to the contents of the NVRAM 105 that stores recovery conditions (i.e., recovery conditions selected on a later-described user interface shown in FIGS. 5 through 8) that the CPU 101 refers to in the control procedure shown in FIG. 10 or the like.

The system bus 113 can connect the above-described functional components (i.e., CPU 101, ROM 102, RAM 103, HDD 108, timer 112, printer I/F control section 104, NVRAM 105, panel control section 106, network I/F control section 107) to realize signal transmission/reception from or to the CPU 101 and data communications between apparatuses or devices.

Figure 2:
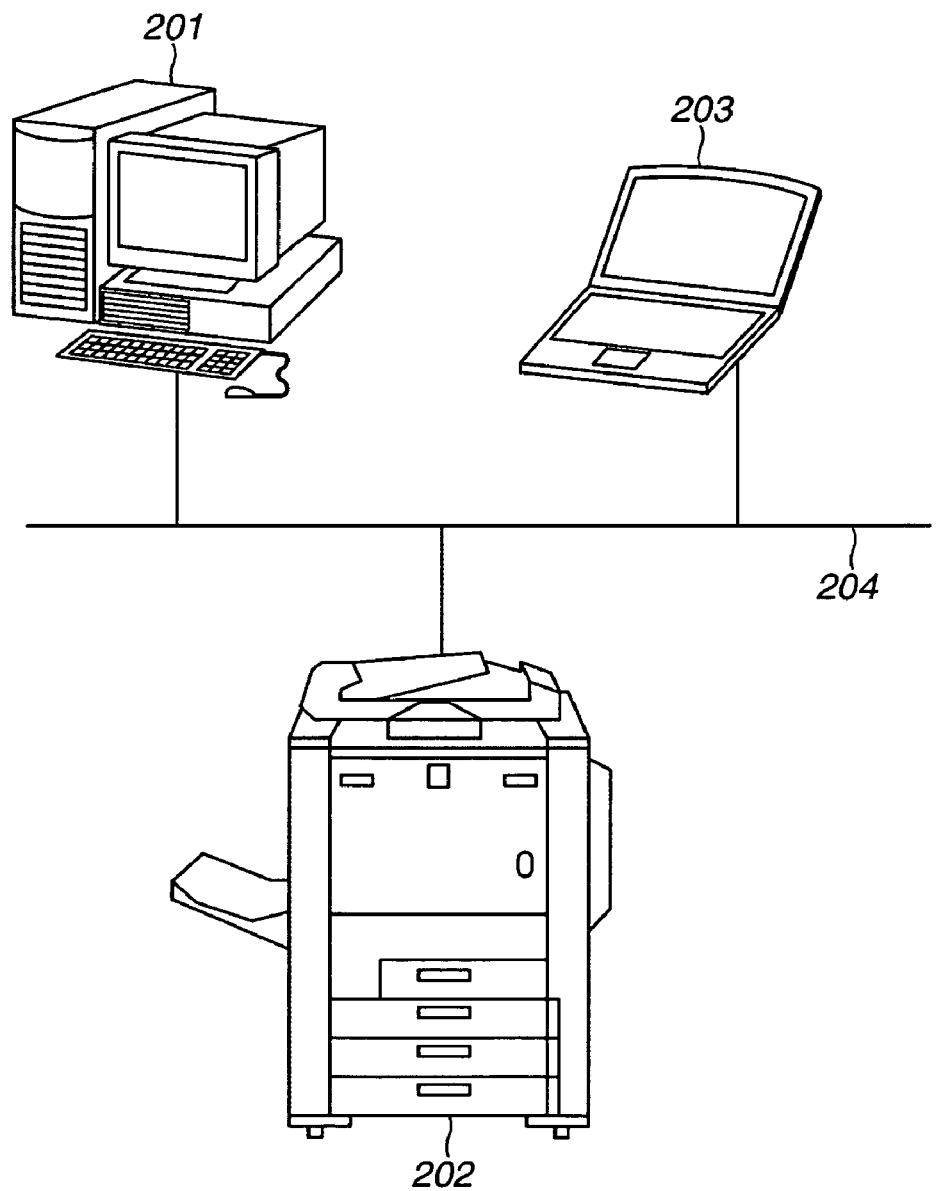
FIG. 2 is a view showing one example of a network system that can include the image processing apparatus shown in FIG. 1.

FIG. 2 is a view showing one example of a network system that can include the image processing apparatus shown in FIG. 1. The network system shown in FIG. 2 includes computers 201 and 203. Each computer includes a controller unit (CPU, RAM, ROM, and the like), a keyboard, a pointing device, a display apparatus, and other peripheral devices. The computer executes various applications under a predetermined OS (i.e., operating system) and produced various data. The computer can communicate, to transmit the data via a printer driver or the like, with the network I/F control section 107 of the controller unit 100 in the network device in compliance with a predetermined protocol. The computers 201 and 203 are connected to a local area network (LAN) 204 and can communicate with a network device 202 via a network interface shown in FIG. 1.

Figures 3, 4:
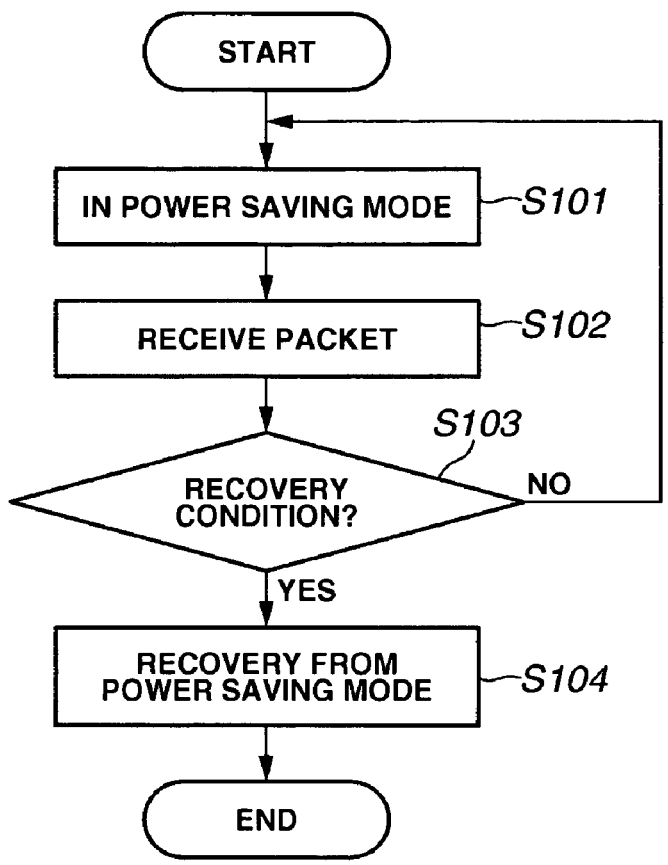
FIG. 3 is a flowchart showing one example of a first power saving mode control procedure performed in the network device of the present invention.
FIG. 4 is a view showing one example of a table showing first recovery conditions stored in a controller unit shown in FIG. 1.

FIG. 3 is a flowchart showing one example of a first power saving mode control procedure performed in the network device. In the first power saving mode control procedure shown in FIG. 3, the network I/F control section 107 operating in a power saving mode can receive packets via the LAN 111 and, after selecting a packet according to a later-described operation, can determine whether the selected packet satisfies recovery conditions stored in its memory 107A. To perform the processing of steps S101 through S104, the network I/F control section 107 can execute the control program loaded from the memory 107A.

First, when the network device 202 is in a power saving mode (i.e., refer to step S101), the network I/F control section 107 can receive packet signals from the computers 201 and 203 or other computers connected to the network (refer to step S102) Then, in step S103, the network I/F control section 107 determines whether or not a received packet is one of packets having the protocol type corresponding to the recovery conditions registered beforehand in a buffer. When the received packet satisfies the recovery conditions (i.e., YES in step S103), the network I/F control section 107 activates the CPU 101 and related sections to change the operating condition of the network device 202 from a power saving mode to a normal operation mode (refer to step S104).

On the other hand, when the received packet does not satisfy the recovery conditions (i.e., NO in step S103), the control procedure returns to the step S101 without canceling the power saving mode. The recovery conditions will be described later in more detail.

Figure 19:
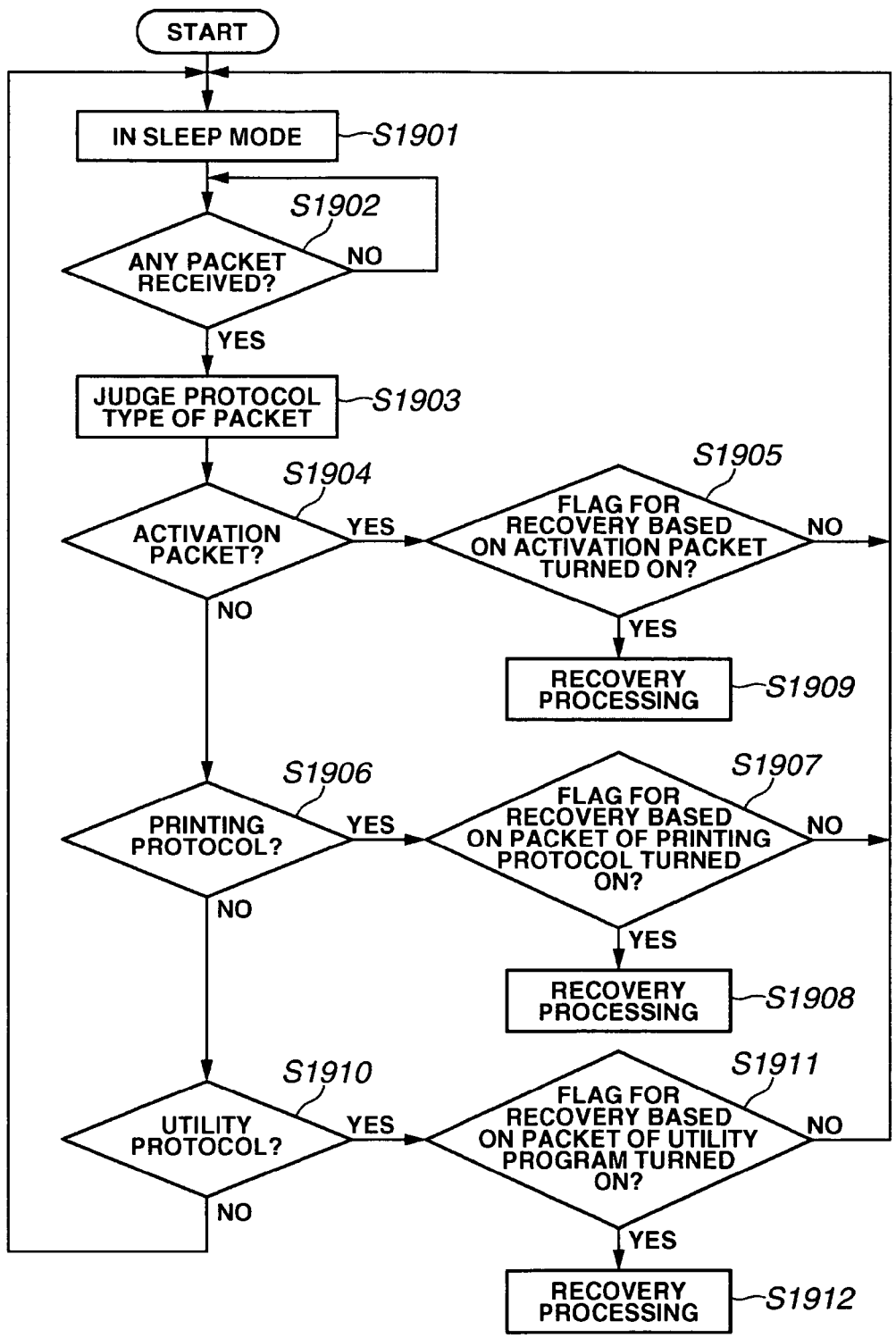
FIG. 19 is a flowchart showing a modified example of the first power saving mode control procedure shown in FIG. 3.

FIG. 19 is a flowchart showing a modified example of the first power saving mode control procedure shown in FIG. 3. The processing shown in FIG. 19 can be started in response to the passage of a predetermined time after the controller unit 100 is activated.

In step S1901, the image processing apparatus is in a sleep mode. When any packet is received (i.e., YES in step S1902), the controller unit 100 detects the protocol of the received packet in step S1903. In step S1904, the controller unit 100 determines whether the packet analyzed in the step S1903 is an activation packet. When the received packet is an activation packet (i.e., YES in step S1904), the control procedure proceeds to step S1905.

In step S1905, the controller unit 100 determines whether a flag instructing the recovery processing in response to an activation packet is in an ON state. When the flag is in an ON state (i.e., YES in step S1905), the controller unit 100 executes the recovery processing in step S1909. When the flag is in an OFF state (i.e., NO in step S1905), the control procedure returns to the step S1901. Returning to the step S1904, when the received packet is not the activation packet, the control procedure proceeds to step S1906.

In step S1906, the controller unit 100 determines whether the received packet can comply with a printing protocol. When the received packet can comply with the printing protocol (i.e., YES in step S1906), the control procedure proceeds to step S1907. In the step S1907, the controller unit 100 determines whether a flag instructing the recovery processing in response to a packet of the printing protocol is in an ON state. When the flag is in an ON state (i.e., YES in step S1907), the control procedure proceeds to step S1908 in which the controller unit 100 executes the recovery processing. When the flag is in an OFF state (i.e., NO in step S1907), the control procedure returns to the step S1901. Returning to the step S1906, when the received packet is not the printing protocol, the control procedure proceeds to step S1910.

In the step S1910, the controller unit 100 determines whether the received packet can comply with a utility protocol. When the received packet can comply with the utility protocol (i.e., YES in step S1910), the control procedure proceeds to step S1911. In the step S1911, the controller unit 100 determines whether a flag instructing the recovery processing in response to a packet of the utility program is in an ON state. When the flag is in an ON state (i.e., YES in step S1911), the control procedure proceeds to step S1912 to execute the recovery processing. When the flag is in an OFF state (i.e., NO in step S1911), the control procedure returns to the step S1901.

Returning to the step S1910, when the received packet cannot comply with the utility protocol (i.e., NO in step S1910), the control procedure returns to the step S1901. The recovery processing will be described in more detail.

Detection of any activation packet in the step S1904 can be performed by determining whether the received packet contains a predetermined bit string. A hardware circuit can be used to perform the judgment. The judgment in the step S1906 can be performed by analyzing a header of the received packet to identify the printing protocol (e.g., LPR, Internet Printing Protocol, FTP direct print, SMTP print, or data transfer protocol for a specific job). For example, the judgment can be made based on a connected port number (well-known port number etc.) or a sender address of the data.

The judgment of the step S1910 can be performed by analyzing a header of the received packet to identify the utility protocol (e.g., a protocol including SNMP, SLP, or a retrieval protocol). For example, the judgment can be made based on a connected port number (well-known port number etc.) or a sender address of the data.

Second Exemplary Embodiment

FIG. 4 is a view showing one example of a table showing first recovery conditions stored in the controller unit 100 shown in FIG. 1. The controller unit 100 can change its operating condition from the power saving mode to the normal operation mode with reference to the recovery conditions shown in FIG. 4. The first recovery condition table shown in FIG. 4 includes plural recovery conditions as a combination of "service menu item" and "corresponding packet". The first recovery condition table can be stored in the NVRAM 105 or in the hard disk 108.

The present exemplary embodiment provides a total of four service menu items: i.e., prohibiting any activation in response to a network packet (first service menu item); activating in response to a start-only packet (second service menu item); activating in response to a printing job request packet (third service menu item); and activating in response to a utility service request packet (fourth service menu item) For example, according to the service menu item "not activated by network packet", any recovery processing responding to an incoming packet transmitted via the network is prohibited and the controller unit 100 can only perform the recovery processing in response to a local input.

Furthermore, according to the service menu item "activated by start-only packet", the controller unit 100 can perform the recovery processing only when a start-only packet is received. In the case of performing the recovery processing in response to the start-only packet, one pattern for the sleep level is that only a limited number of power consuming units (i.e., such as CPU 101 and RAM 103) be activated and another pattern for the sleep level is that the entire function of the device be activated. The processing of step S1909 shown in FIG. 19 corresponds to this processing.

Furthermore, according to the service menu item "activated by printing job packet (i.e., packet complying with a printing protocol)", the controller unit 100 can perform the recovery processing in response to an ARP or MAC address transmitted to the network device, in addition to the recovery conditions for the service menu item "activated by start-only packet". In the case of performing the recovery processing in response to the printing job packet, one pattern for the sleep level is that only a limited number of power consuming units (e.g., CPU 101, RAM 103, printer I/F 104, NVRAM 105, printer 110, and HDD 108 if required for spool) be activated for the printing processing and another pattern for the sleep level is that the entire function of the device be activated. The processing of step S1908 shown in FIG. 19 corresponds to this processing.

Furthermore, according to the service menu item "activated by utility service packet", the controller unit 100 can perform the recovery processing in response to an SLP or SNMP polling packet or a maker's individual packet relating to a utility service request other than the printing job, in addition to the recovery conditions for the service menu items "activated by start-only packet" and "activated by printing job packet". In the case of performing the recovery processing in response to the SLP or SNMP packet, one pattern for the sleep level is that only a limited number of power consuming units (e.g., CPU 101, RAM 103, and NVRAM 105) be activated and another pattern for the sleep level is that the entire function of the device be activated. The processing of step S1912 shown in FIG. 19 corresponds to this processing.

In this exemplary embodiment, the meaning of "activation" is that a specific or designated portion of the network device restarts its normal operation under the supply of electric power. More specifically, in response to a user's input, the CPU 101 selects a specific recovery condition from plural recovery conditions. Then, upon receiving a data packet complying with a specific protocol, the CPU 101 cancels the power saving condition of a specific power consuming unit of the network device in accordance with the selected recovery condition. Thus, the CPU 101 enables the network device to cancel the power saving condition and return to the normal operation.

In the service menu, the service menu item "activated by start-only packet" and the service menu item "activated by printing job packet" have some dependency as described later. Thus, the CPU 101 and the panel control section 106 perform a display control in such a manner that the contents of display can be differentiated depending on the selected conditions.

FIGS. 5 through 8 are views respectively showing an example of the recovery condition setting screen displayed on the operation panel 109 shown in FIG. 1, i.e., an example of user interface (UI) relating to the condition setting for recovering the network device from the power saving mode. The CPU 101 and the panel control section 106 perform the panel display control.

The recovery condition setting screen shown in FIGS. 5 through 8 displays a list of plural service menu items that enables a user to select desirable processing for recovering the network device from the power saving mode. In the recovery condition setting screen shown in FIGS. 5 through 8, a vertical bar B indicates the level of power saving effects (as an indicator showing the intensity of the power saving effects). The power saving effects can be enhanced (i.e., go into a deep sleeping condition) when the indication of the bar B rises to an upper region. On the other hand, the power saving effects can be weakened (i.e., go into a shallow sleeping condition) when the indication of the bar B remains in a lower region. The user can push an "OK" button BT1 after finishing the selection.

Furthermore, respective recovery conditions have mutual dependency. Thus, depending on a selected service menu item, the network device can automatically determine whether other service menu item(s) can be included as adaptive conditions. If there is any dependency, the network device can validate other service menu item(s).

Figure 7:
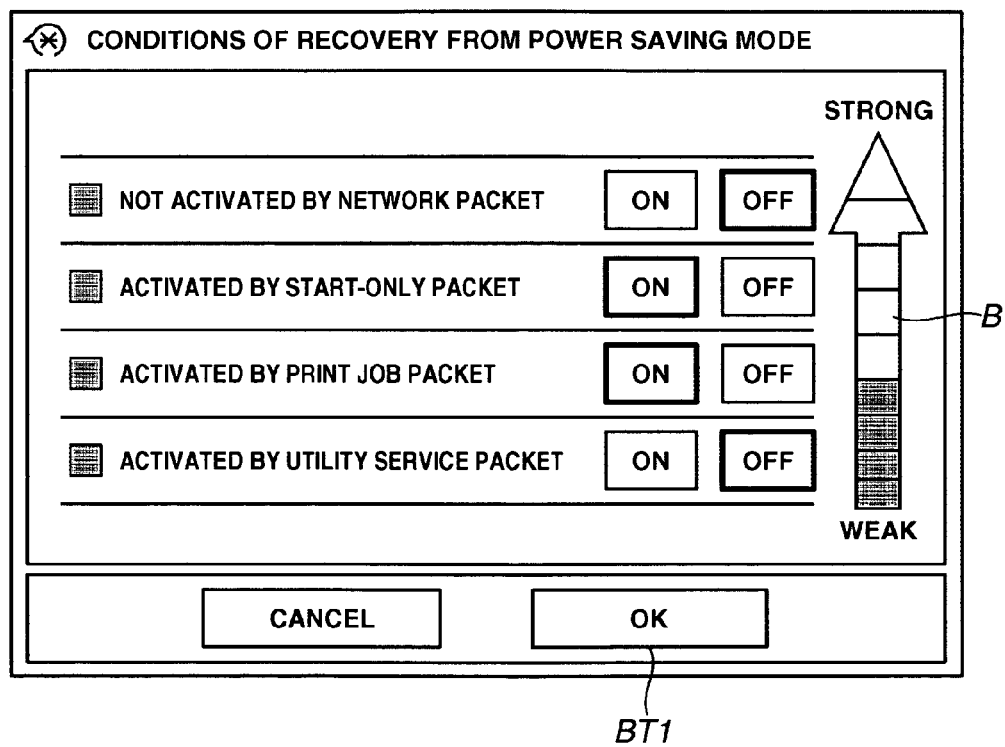
FIG. 7 is a view showing one example of the recovery condition setting screen displayed on the operation panel shown in FIG. 1.
Figure 8:
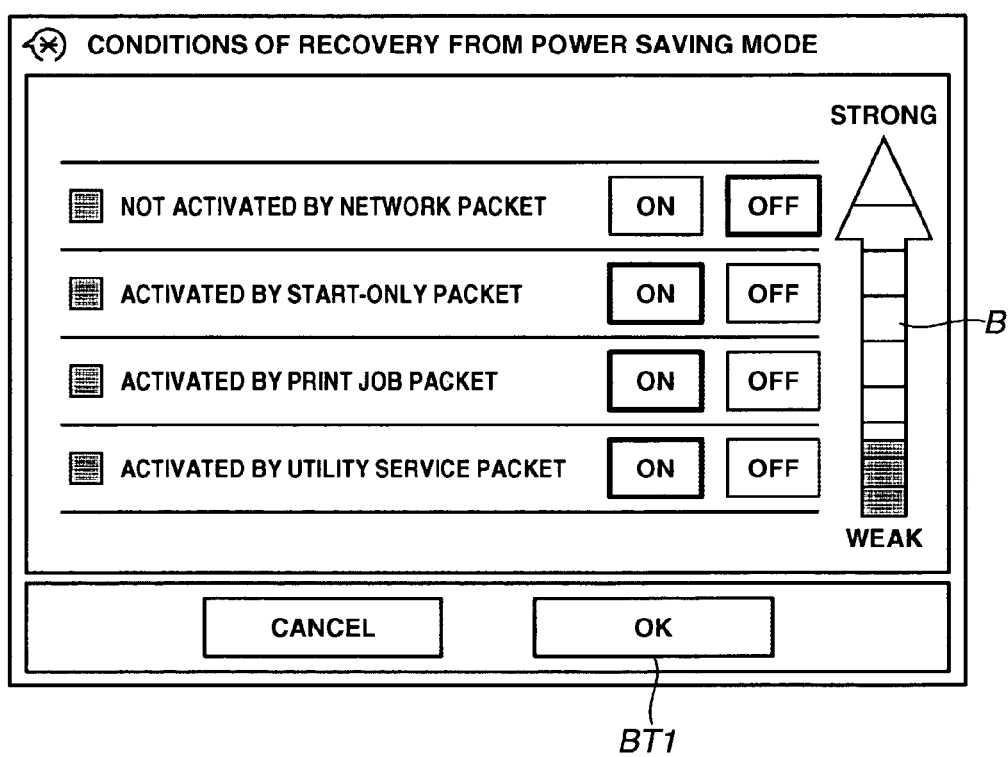
FIG. 8 is a view showing one example of the recovery condition setting screen displayed on the operation panel shown in FIG. 1.
Figure 9:
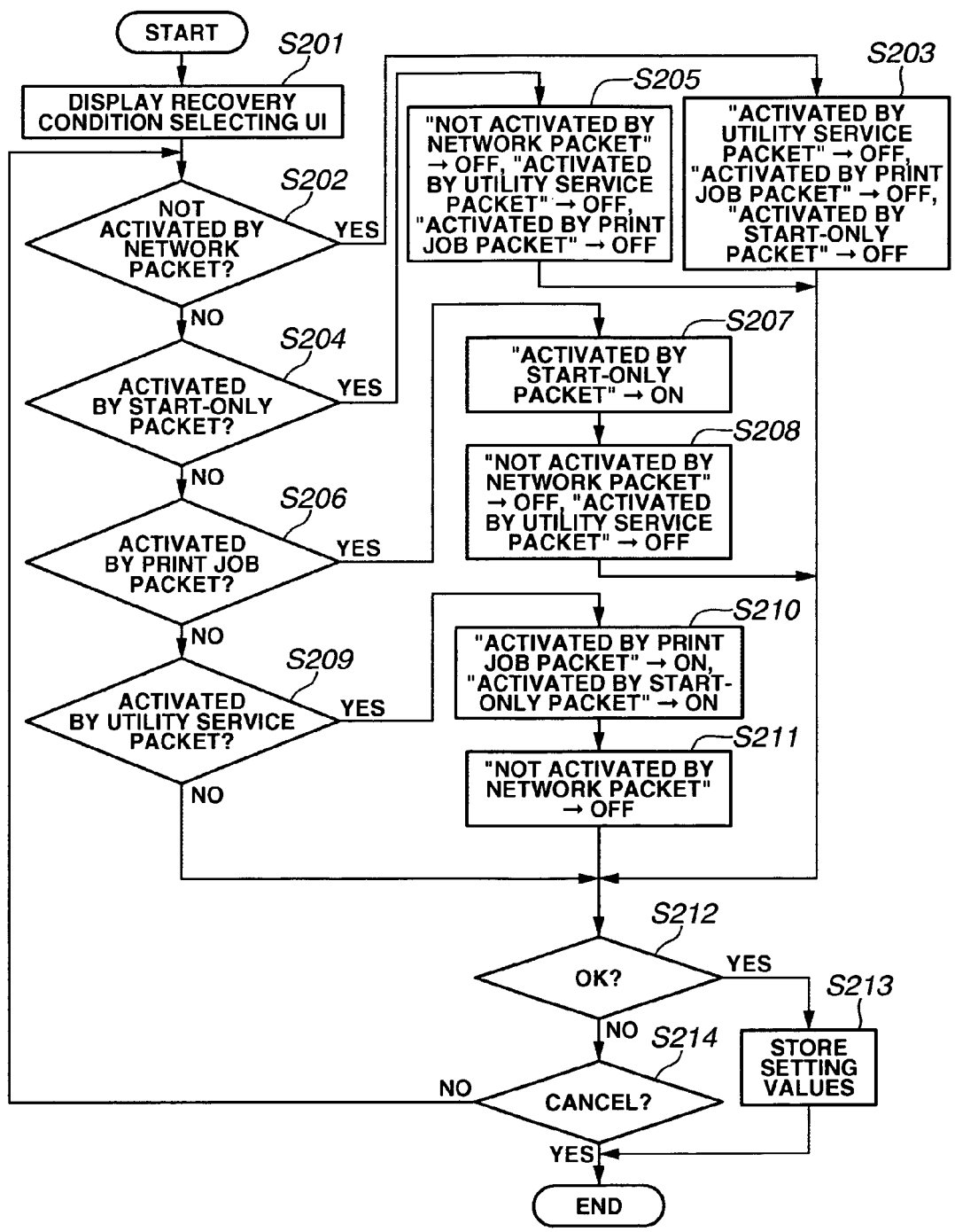
FIG. 9 is a flowchart showing one example of a second power saving mode control procedure performed in the network device of the present invention.
Figure 10:
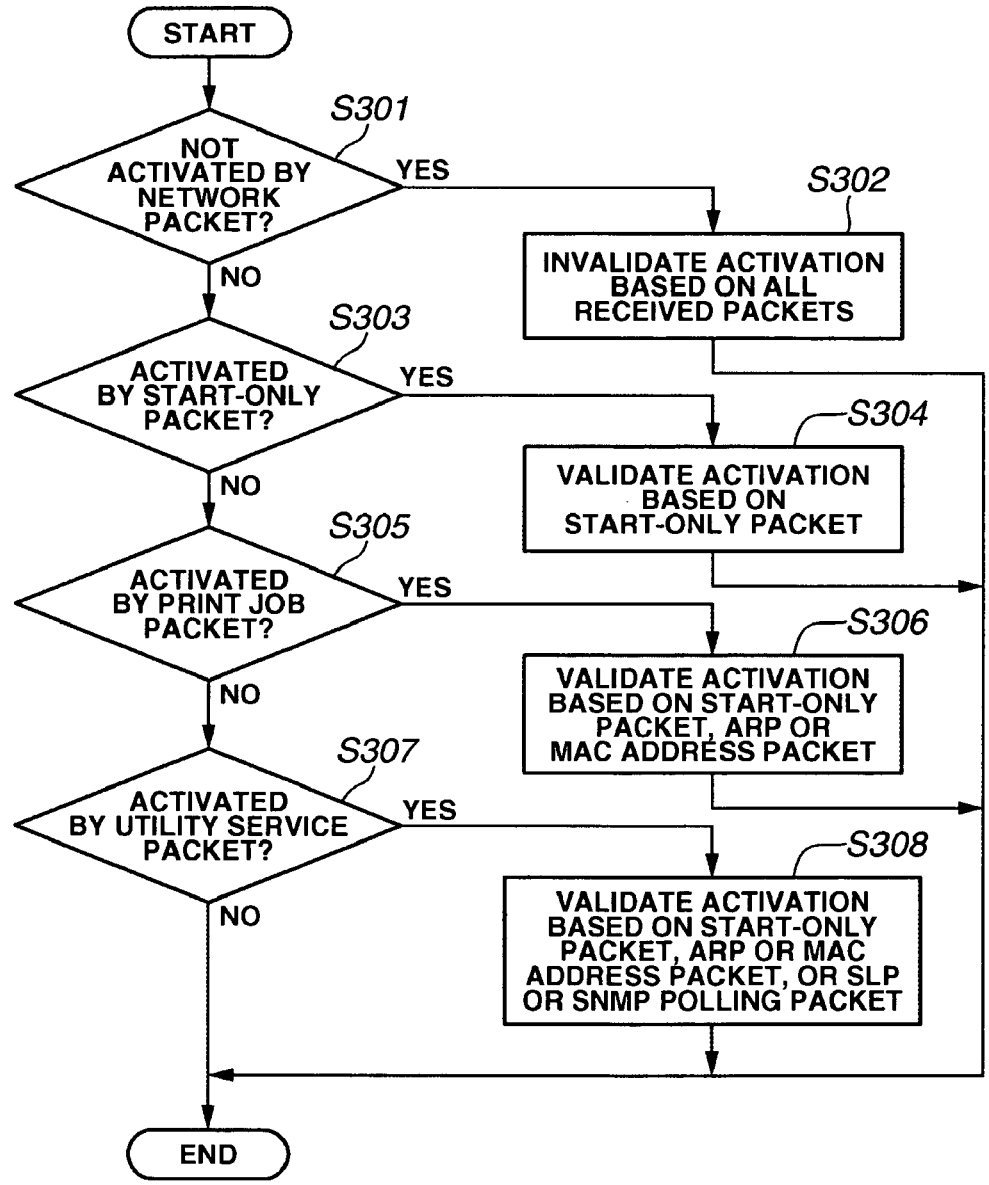
FIG. 10 is a flowchart showing one example of a third power saving mode control procedure performed in the network device of the present invention.

FIG. 9 shows a flowchart of a UI setting module relating to a user's operation for selecting a desirable service menu item on the UI shown in FIGS. 5 through 8. Furthermore, FIG. 10 shows a flowchart of a recovery condition discriminating module relating to the processing for discriminating respective service menu items being internally set after the recovery conditions are set and automatically selecting a received packet corresponding to each service menu item.

FIG. 9 is a flowchart showing one example of a second power saving mode control procedure performed in the network device of the present invention, corresponding to the control procedure of a UI setting module (stored in the ROM 102 or in the hard disk 108 shown in FIG. 1) that allows a user to set the conditions for recovering the network device from the power saving mode through the UI shown in FIGS. 5 through 8. To execute the processing of steps S201 through S214, the CPU 101 and the panel control section 106 execute the control program loaded from the hard disk 108 or the ROM 102 to the RAM 103 shown in FIG. 1.

Figure 5:
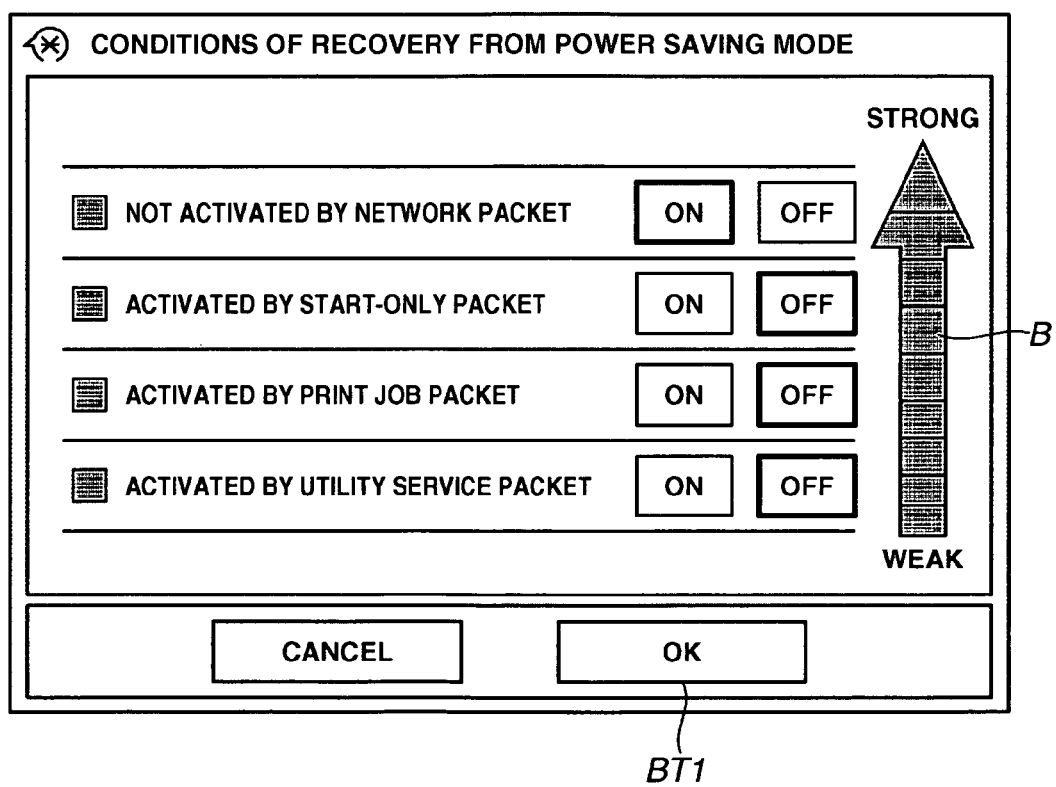
FIG. 5 is a view showing one example of a recovery condition setting screen displayed on an operation panel shown in FIG. 1.

First, the CPU 101 executes the UI setting module of step S201 to cause the panel control section 106 to switch the UI display as shown in FIGS. 5 through 8 in response to an instruction from the CPU 101. Next, based on a user's selection entered through the operation panel 109, the CPU 101 executes the UI setting module of step S202 to determine whether the user selected the service menu item "not activated by network packet". When the service menu item "not activated by network packet" is selected (i.e., YES in step S202), the CPU 101 turns the display of the non-elected service menu items into an OFF state i.e., into a gray-out state as shown in FIG. 5, on the operation panel 109 (refer to step S203). Then, the control procedure proceeds to step S212.

Figure 6:
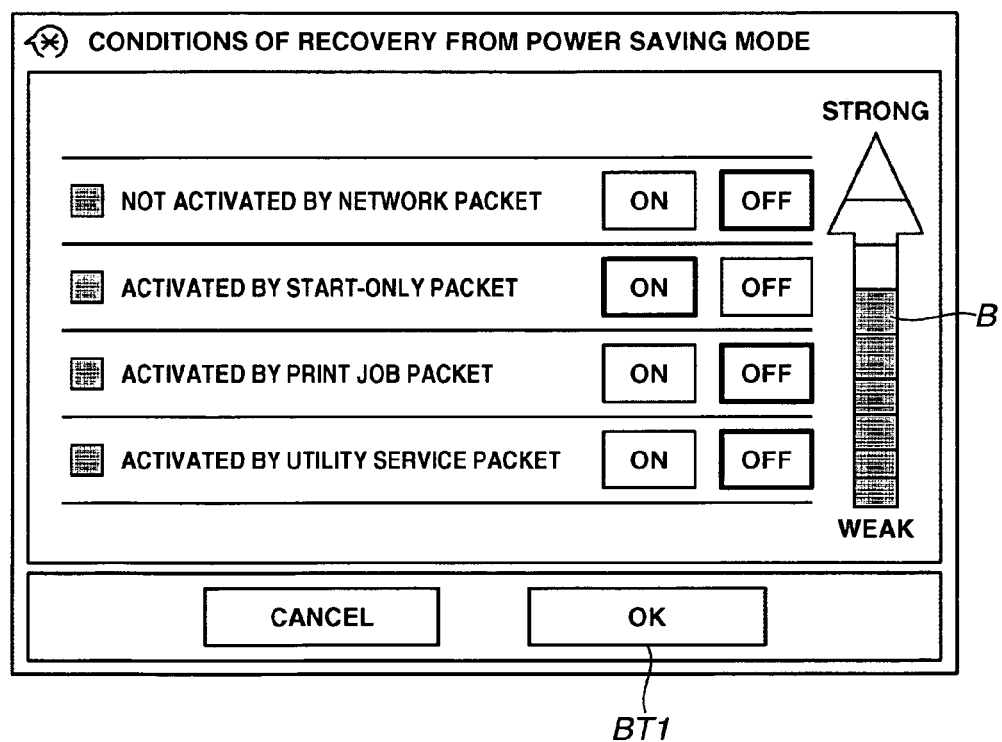
FIG. 6 is a view showing one example of the recovery condition setting screen displayed on the operation panel shown in FIG. 1.

On the other hand, when the service menu item "not activated by network packet" is not selected (i.e., NO in step S202), the CPU 101 executes the UI setting module of step S204 to determine whether the user selected the service menu item "activated by start-only packet". When the service menu item "activated by start-only packet" is selected (i.e., YES in step S204), the CPU 101 turns the display of the non-elected service menu items into an OFF state, i.e., into a gray-out state as shown in FIG. 6, on the operation panel 109 (refer to step S205). Then, the control procedure proceeds to step S212.

On the other hand, when the service menu item "activated by start-only packet" is not selected (i.e., NO in step S204), the CPU 101 executes the UI setting module of step S206 to determine whether the user selected the service menu item "activated by printing job packet". When service menu item "activated by printing job packet" is selected (i.e., YES in step S206), the CPU 101 turns the display of the service menu item "activated by start-only packet" into an ON state on the operation panel 109 (refer to step S207), because the service menu item "activated by printing job packet" is dependent on the service menu item "activated by start-only packet". Then, in step S208, the CPU 101 turns the display of the remaining service menu items "not activated by network packet" and "activated by utility service packet" into an OFF state, i.e., into a gray-out state as shown in FIG. 7. Then, the control procedure proceeds to step S212.

On the other hand, when the service menu item "activated by printing job packet" is not selected (i.e., NO in step S206), the CPU 101 executes the UI setting module of step S209 to determine whether the user selected the service menu item "activated by utility service packet". When the service menu item "activated by utility service packet" is selected (i.e., YES in step S209), the CPU 101 turns the display of the service menu items "activated by printing job packet" and the service menu item "activated by start-only packet" into an ON state on the operation panel 109 (refer to step S210), because the service menu item "activated by utility service packet" is dependent on the service menu items "activated by printing job packet" and "activated by start-only packet". Then, in step S211, the CPU 101 turns the display of the remaining service menu item "not activated by network packet" into an OFF state, i.e., into a gray-out state as shown in FIG. 8. Then, the control procedure proceeds to step S212.

On the other hand, when the service menu item "activated by utility service packet" is not selected (i.e., NO in step S209), the CPU 101 executes the UI setting module of step S212 to determine whether the user completed the "setting" (i.e., whether the user depressed the OK button BT1). When the "setting" is completed, the CPU 101 stores the recovery condition setting values into the NVRAM 105 or the hard disk 108 (refer to step S213) before terminating this processing routine. The internal setting changes can be transferred to the recovery condition discriminating module shown in FIG. 10.

On the other hand, when the OK button BT1 is not depressed (i.e., NO in step S212), the CPU 101 executes the UI setting module of step S214 to determine whether the user selected the "cancel", i.e., whether the user depressed a cancel button BT2. When the "cancel" is selected (YES in step S214), the CPU 101 terminates this control routine without storing any setting values. Otherwise, the control procedure returns to the step S202.

As apparent from the foregoing description, the user can easily operate on the operation panel 109 to select the recovery conditions without considering the protocol type or other network information. Thus, the user can easily select a desirable level of the recovery conditions and register the selected conditions in the memory by adjusting the height of the bar B displayed on the screen to obtain a power saving effect on the network.

FIG. 10 is a flowchart showing one example of a third power saving mode control procedure in accordance with the network device of the present invention. The third power saving mode corresponds to the control procedure of a recovery condition discriminating module that enables automatically changing the present recovery condition setting values based on the recovery conditions stored in the NVRAM 105 or other memory according to the UI setting module. To execute the processing of steps S301 through S308, the CPU 101 executes the control program loaded from the hard disk 108 or the ROM 102 to the RAM 103 shown in FIG. 1.

The CPU 101 executes the processing of FIG. 10 immediately after accomplishing the processing shown in FIG. 9, or in response to a turning-on of the electric power source for the network device, or in response to confirmation of condition change performed at predetermined time intervals.

First, the CPU 101 executes the recovery condition discriminating module of step S301 to determine whether the service menu item "not activated by network packet" is stored in the memory as the recovery conditions. When the memory stores the setting value "not activated by network packet" (i.e., YES in step S301), the CPU 101 controls the network I/F control section 107 to invalidate all activation commands of the packets received via the network (refer to step S302). The memory 107A of the network I/F control section 107 stores the above nullification settings before this control routine terminates. Accordingly, the power saving effect can be set to an extremely higher level.

On the other hand, when the memory (e.g., NVRAM 105) does not store the setting value "not activated by network packet" (i.e., NO in step S301), the CPU 101 executes the recovery condition discriminating module of step S303 to determine whether the memory (e.g., NVRAM 105) stores the service menu item "activated by start-only packet" as a setting value for the recovery conditions.

When the service menu item "activated by start-only packet" is stored (i.e., YES in step S303), the CPU 101 controls the network I/F control section 107 to store in its memory 107A the setting data relating to the processing for recovering the network device from the power saving mode only when a start-only packet is received (refer to step S304) before terminating this control procedure.

On the other hand, when the memory (e.g., NVRAM 105) does not store the service menu item "activated by start-only packet" (i.e., NO in step S303), the CPU 101 executes the recovery condition discriminating module of step S305 to determine whether the memory (e.g., NVRAM 105) stores the service menu item "activated by printing job packet" as a setting value for the recovery conditions.

When the service menu item "activated by printing job packet" is stored (i.e., YES in step S305), the CPU 101 controls the network I/F control section 107 to store in its memory 107A the setting data relating to the processing for recovering the network device from the power saving mode when a start-only packet or an ARP or MAC address packet is received (refer to step S306) before terminating this control procedure, because the recovery condition "activated by printing job packet" is dependent on the recovery condition "activated by start-only packet".

On the other hand, when the memory (e.g., NVRAM 105) does not store the service menu item "activated by printing job packet" (i.e., NO in step S305), the CPU 101 executes the recovery condition discriminating module of step S307 to determine whether the memory (e.g., NVRAM 105) stores the service menu item "activated by utility service packet" as a setting value for the recovery condition.

When the service menu item "activated by utility service packet" is stored (i.e., YES in step S307), the CPU 101 controls the network I/F control section 107 to store in its memory 107A the setting data relating to the processing for recovering the network device from the power saving mode when a start-only packet or an ARP or MAC address packet, or an SLP or SNMP polling packet is received (refer to step S308) before terminating this control procedure, because the recovery condition "activated by utility service packet" is dependent on both the recovery condition "activated by printing job packet" and the recovery condition "activated by start-only packet".

On the other hand, when the memory (e.g., NVRAM 105) does not store the service menu item "activated by utility service packet" (i.e., NO in step S307), the CPU 101 terminates this control routine.

With this arrangement, the network device can display recovery conditions corresponding to the communication protocol type in a stepwise manner in relation to power saving effects, and a user can directly select a desirable recovery condition on the operation panel 109 with reference to the displayed contents (i.e., service menu items SJ1 to SJ4 that are expressed in the form of a text).

Thus, even if a user has no specialized knowledge with respect to the packets or the like, the user can easily set network environments corresponding to the recovery conditions and can customize the network communication function so as to realize a unique recovery to the normal operation mode. Furthermore, selecting a recovery condition capable of bringing enhanced power saving effects (e.g., no sleep recovery occurs in response to an unnecessary packet) enables the setting of robust power saving conditions that can realize a highly effective power saving.

Third Exemplary Embodiment

According to the above-described exemplary embodiments, a user can select a desirable service, as the conditions for recovering the network device from the power saving mode, on a display screen that displays plural service menu items selectable in accordance with a protocol type. The third exemplary embodiment can realize a display using sleep levels in addition to the above-described recovery conditions so that users can easily select desirable recovery conditions without the knowledge relating to the packets.

FIG. 11 is a view showing one example of a table showing second recovery conditions stored in the controller unit 100 shown in FIG. 1. The table includes plural sleep levels SL (1, 2, 3, and 4) corresponding to plural service menu items SJ in the order of the power saving effects. The higher the sleep level SL, the stronger the power saving effects. For example, the service menu item "not activated by network packet" corresponds to the sleep level 4 because it brings strongest power saving effects. As described above, the controller unit 100 cannot perform the recovery processing unless a local input is entered.

Furthermore, the service menu item "activated by start-only packet" corresponds to the sleep level 3 because it brings next strongest power saving effects. The service menu item "activated by printing job packet" corresponds to the sleep level 2. The service menu item "activated by utility service packet" corresponds to the sleep level 1 because it brings weakest power saving effects. In other words, the recovery conditions corresponding to the sleep level 1 are substantially identical with the recovery conditions for the default power saving mode.

FIGS. 12 through 15 are views showing an example of a user interface (UI) in accordance with the third exemplary embodiment of the present invention, which allows a user to set the conditions for recovering the network device from the power saving mode. The same items as in FIGS. 5 through 8 are represented by the same numerals and letters.

The user interface (UI) shown in FIGS. 12 through 15 displays a list of plural service menu items so that a user can select a desirable service menu item as the conditions for recovering the network device from the power saving mode. A bar B on the right side of the UI indicates the sleep level SL.

The bar B has a gradation changing from a light side (corresponding to a weak sleeping condition, i.e., a weak power saving effect) to a dark side (corresponding to a strong sleeping condition, i.e., a strong power saving effect). A level setting button LB on the upper right side of the UI allows a user to select one of four sleep levels 1 to 4. The user can depress an "OK" button BT1 to fix the setting after finishing the selection.

Furthermore, similar to the above-described service menu items, respective sleep levels have mutual dependency. Thus, depending on a selected sleep level SL, the network device can automatically determine whether other recovery conditions be included as adaptive conditions. If there is any dependency, the network device can validate other recovery conditions.

Figure 16:
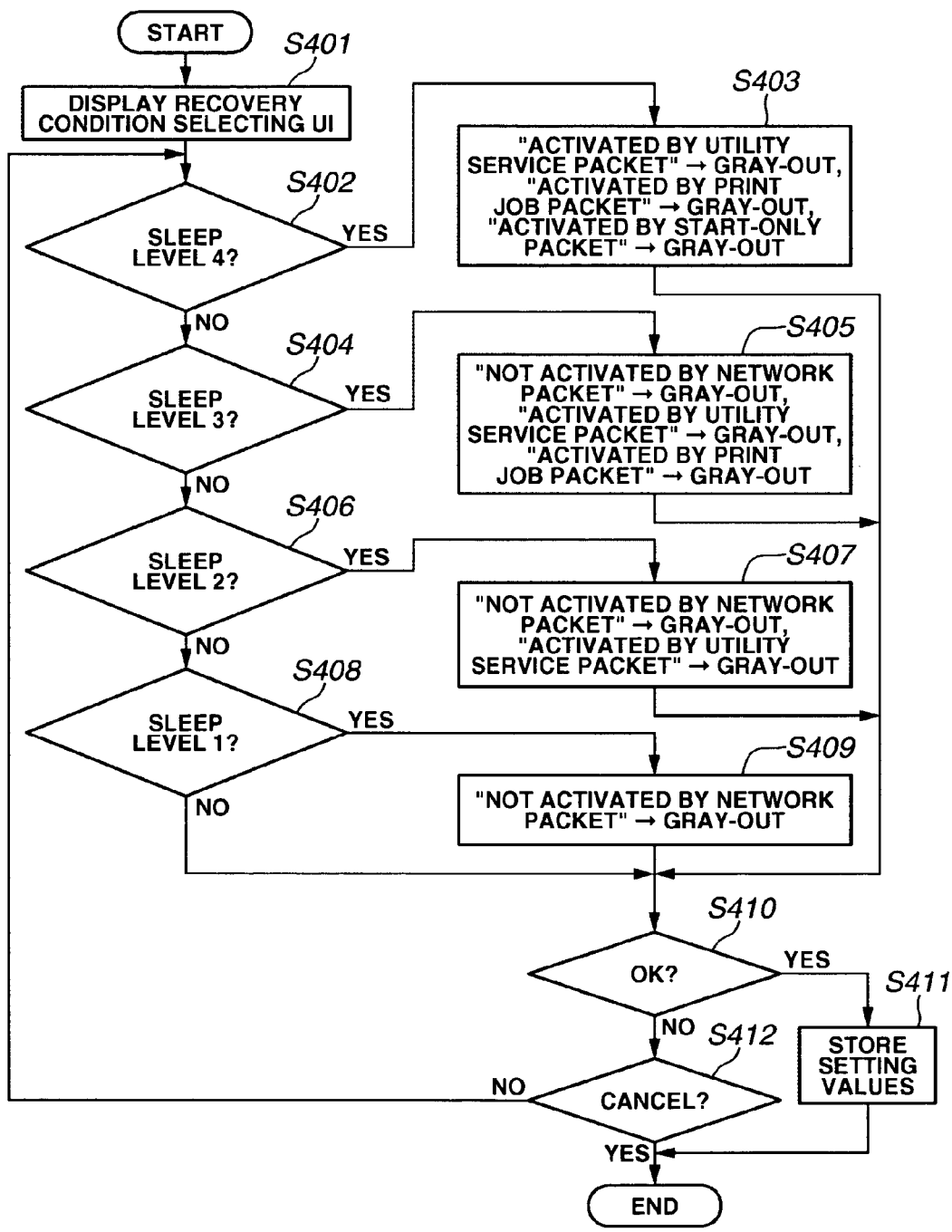
FIG. 16 is a flowchart showing one example of a fourth power saving mode control procedure performed in the network device of the present invention.

FIG. 16 is a flowchart showing one example of a fourth power saving mode control procedure performed in the network device of the present invention. The fourth power saving mode corresponds to the control procedure of a UI setting module executed by the CPU 101 that allows a user to set the conditions for recovering the network device from the power saving mode through the UI displayed on the operation panel 109. To execute the processing of steps S401 through S412, the CPU 101 executes the control program loaded from the hard disk 108 or the ROM 102 to the RAM 103 shown in FIG. 1.

Figure 17:
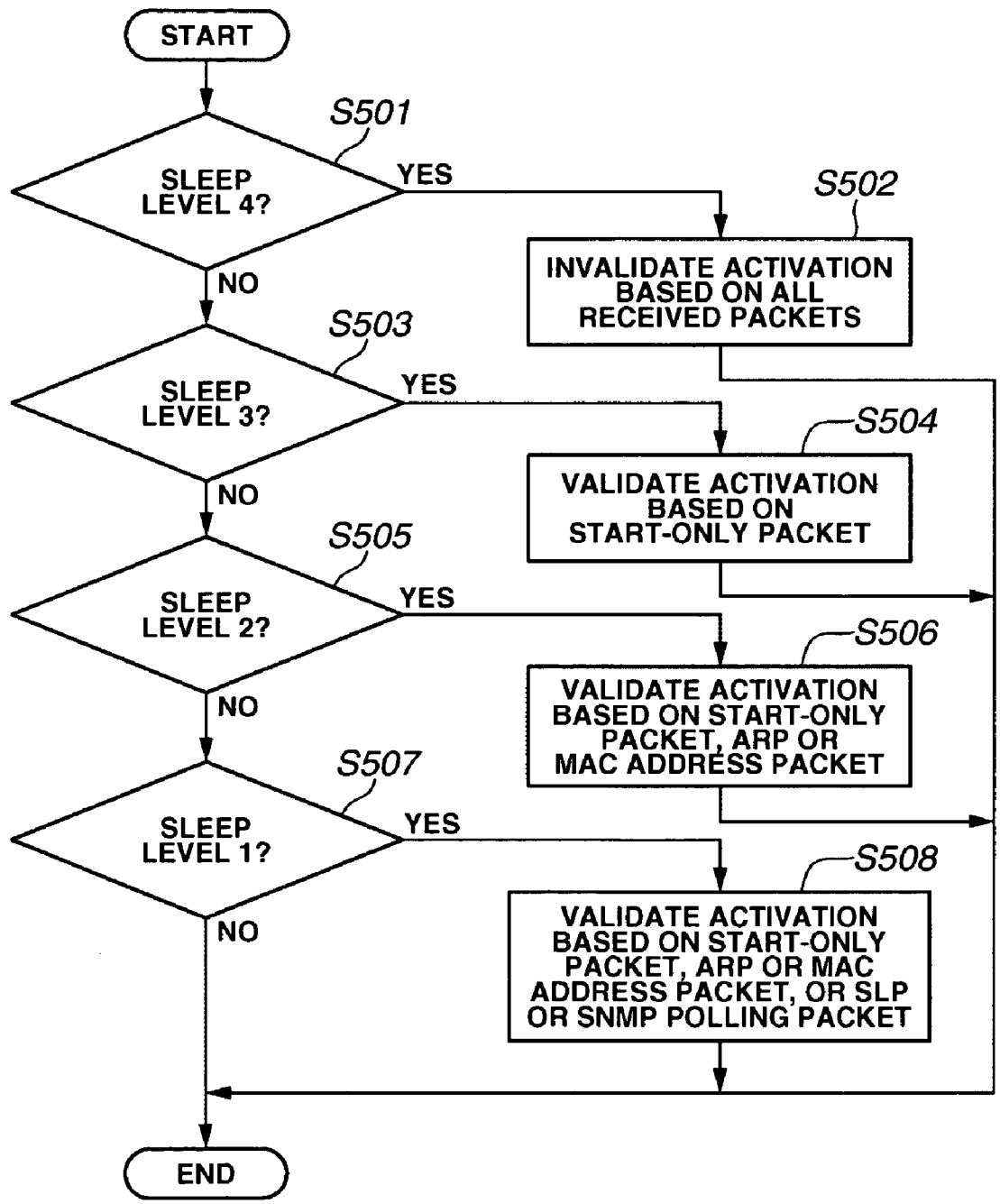
FIG. 17 is a flowchart showing one example of a fifth power saving mode control procedure performed in the network device of the present invention.

Furthermore, FIG. 17 shows the processing relating to a recovery condition discriminating module, performed after the recovery conditions are set, which automatically selects a received packet corresponding to each sleep level SL being internally set.

Figure 12:
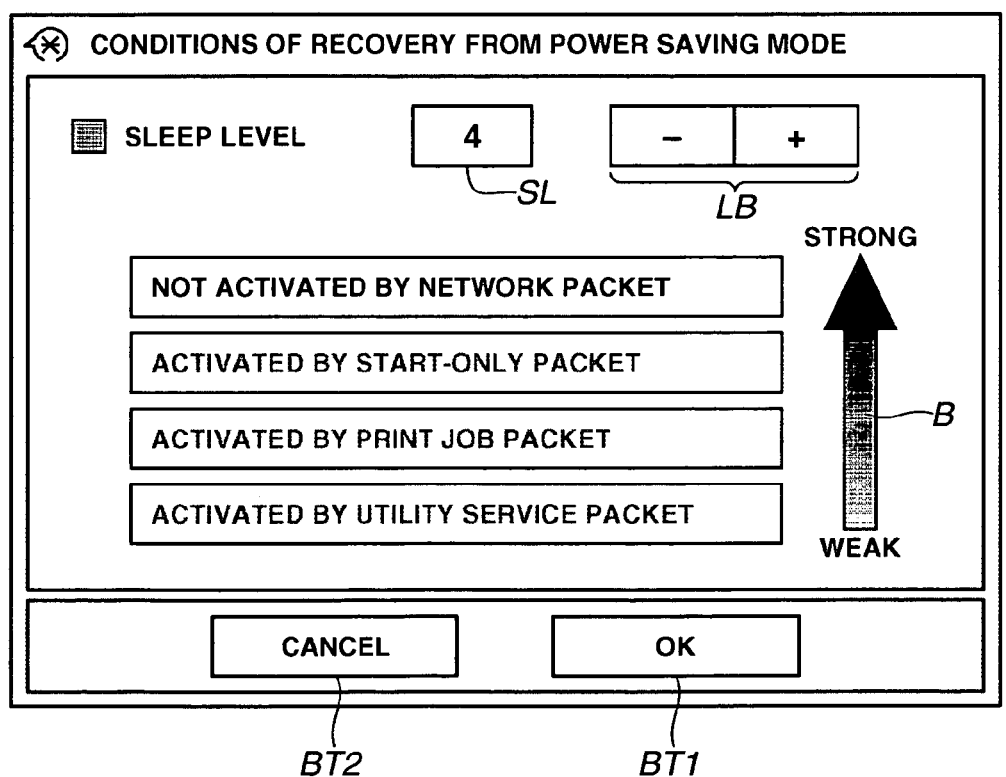
FIG. 12 is a view showing an example of a user interface (UI) in accordance with a third embodiment of the present invention, which allows a user to set the conditions for recovering the network device from a power saving mode.

First, the CPU 101 executes the UI setting module of step S401 to display the UI shown in FIGS. 12 through 15 on the operation panel 109. Next, the CPU 101 executes the UI setting module of step S402 to determine whether the "sleep level 4" is selected. When the "sleep level 4" is selected (i.e., YES in step S402), the CPU 101 turns the display of the service menu items other than the service menu item "not activated by network packet" into a gray-out state as shown in FIG. 12 on the operation panel 109 (refer to step S403). Then, the control procedure proceeds to step S410.

Figure 13:
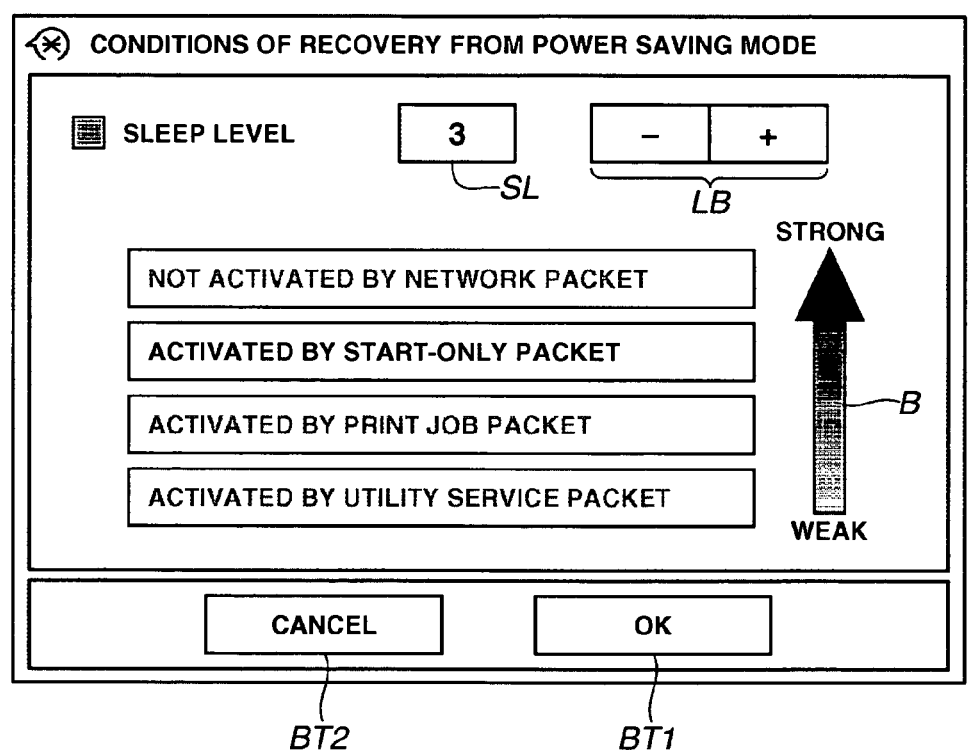
FIG. 13 is a view showing an example of the UI in accordance with the third embodiment of the present invention, which allows a user to set the conditions for recovering the network device from the power saving mode.

On the other hand, when the "sleep level 4" is not selected (i.e., No in step S402), the CPU 101 executes the UI setting module of step S404 to determine whether the "sleep level 3" is selected. When the "sleep level 3" is selected (i.e., YES in step S404), the CPU 101 turns the display of the service menu items other than the service menu item "activated by start-only packet" into a gray-out state as shown in FIG. 13 on the operation panel 109 (refer to step S405). Then, the control procedure proceeds to step S410.

Figure 14:
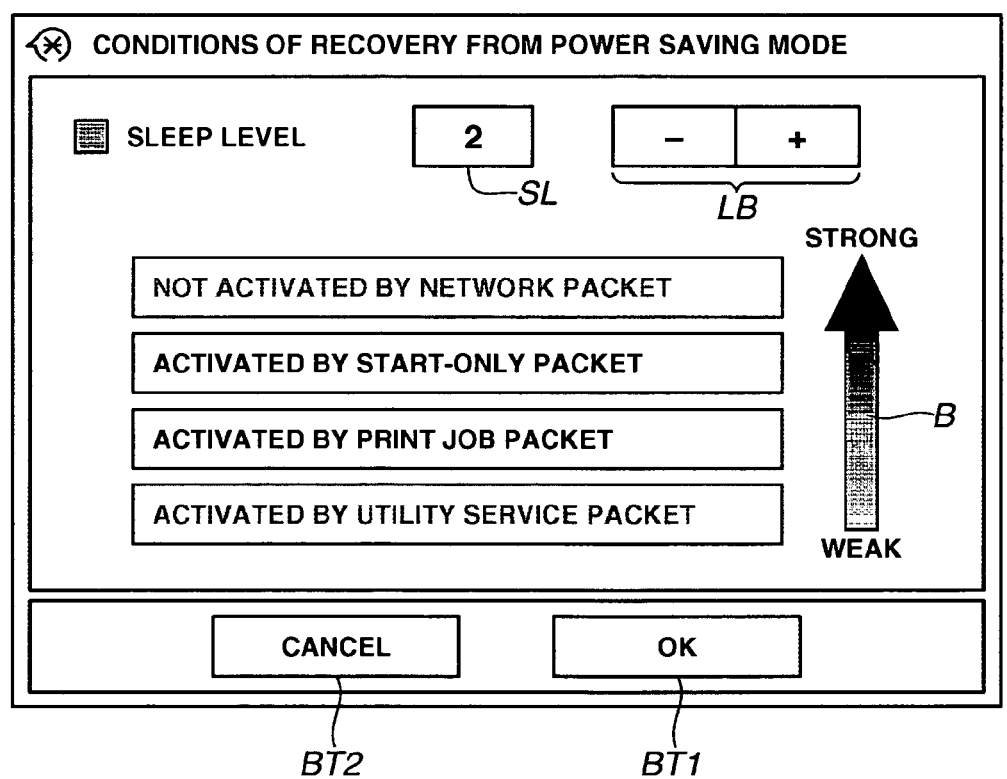
FIG. 14 is a view showing an example of the UI in accordance with the third embodiment of the present invention, which allows a user to set the conditions for recovering the network device from the power saving mode.

On the other hand, when the "sleep level 3" is not selected (i.e., No in step S404), the CPU 101 executes the UI setting module of step S406 to determine whether the "sleep level 2" is selected. When the "sleep level 2" is selected (i.e., YES in step S406), the CPU 101 turns the display of the service menu item "not activated by network packet" and the service menu items "activated by utility service packet" into a gray-out state as shown in FIG. 14 on the operation panel 109 (refer to step S407). Namely, the "sleep level 2" and the "sleep level 3", i.e., the service menu item "activated by printing job packet" and the service menu item "activated by start-only packet", have mutual dependency. Then, the control procedure proceeds to step S410.

Figure 15:
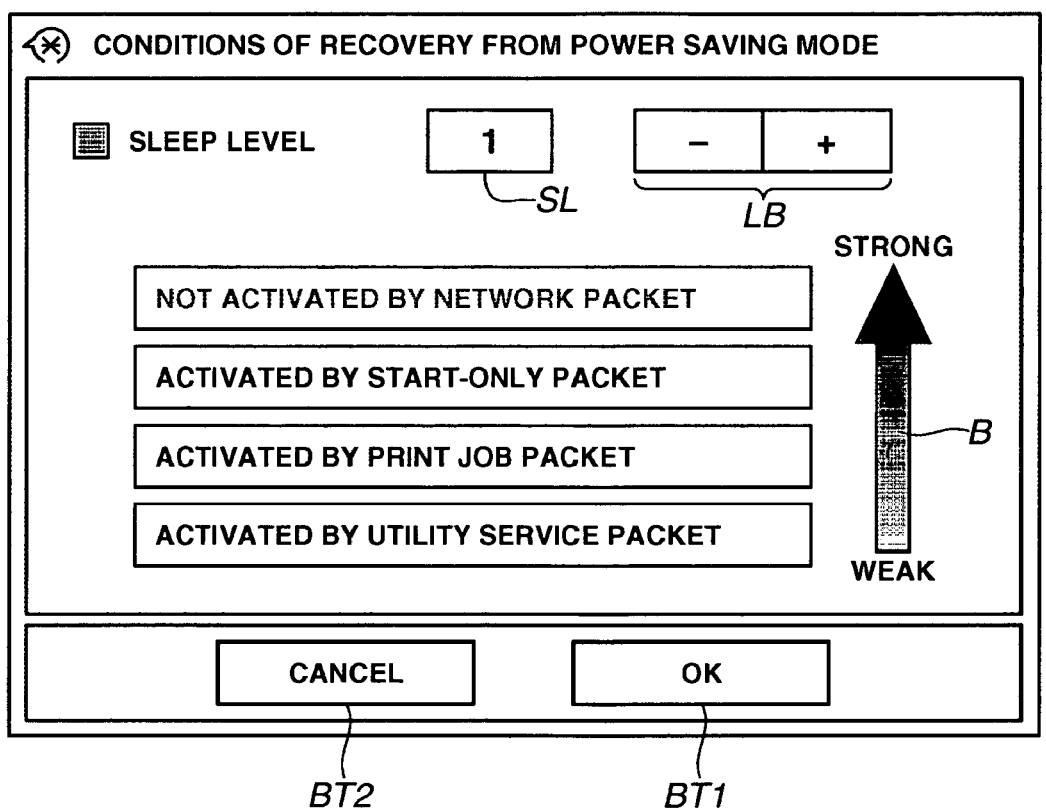
FIG. 15 is a view showing an example of the UI in accordance with the third embodiment of the present invention, which allows a user to set the conditions for recovering the network device from the power saving mode.

On the other hand, when the "sleep level 2" is not selected (i.e., No in step S406), the CPU 101 executes the UI setting module of step S408 to determine whether the "sleep level 1" is selected. When the "sleep level 1" is selected (i.e., YES in step S408), the CPU 101 turns the display of the service menu item "not activated by network packet" into a gray-out state as shown in FIG. 15 on the operation panel 109 (refer to step S409). Namely, the "sleep level 1", the "sleep level 2", and the "sleep level 3" have mutual dependency. Namely, the service menu item "activated by utility service packet", the service menu item "activated by printing job packet", and the service menu item "activated by start-only packet" have mutual dependency. Then, the control procedure proceeds to step S410.

On the other hand, when the "sleep level 1" is not selected (i.e., No in step S408), the CPU 101 executes the UI setting module of step S410 to determine whether the "setting" is completed. When the "setting" is completed, the CPU 101 stores the recovery condition setting values into the NVRAM 105 or the hard disk 108 (refer to step S411) before terminating this processing routine. The internal setting changes can be transferred to the processing of the later-described recovery condition discriminating module shown in FIG. 17.

On the other hand, when the "setting" is not completed (i.e., NO in step S410), the CPU 101 executes the UI setting module of step S412 to determine whether the user selected the "cancel". When the "cancel" is selected (YES in step S412), the CPU 101 terminates this control routine without storing any setting values. Otherwise, when the "cancel" is not selected, the control procedure returns to the step S402.

With this arrangement, even if a user has no specialized knowledge with respect to the protocol type or network, the user can easily accomplish the network settings by simply selecting a desirable sleep level SL from the UI displayed on the operation panel 109.

FIG. 17 is a flowchart showing one example of a fifth power saving mode control procedure performed in the network device of the present invention. The fifth power saving mode corresponds to a control procedure of the recovery condition discriminating module that automatically changes the setting values being stored in the memory through the above-described UI setting module. To execute the processing of steps S501 through S508, the CPU 101 executes the control program loaded from the hard disk 108 or the ROM 102 to the RAM 103 shown in FIG. 1.

The CPU 101 executes the processing of FIG. 17 immediately after accomplishing the processing shown in FIG. 16, or in response to a turning-on of the electric power source for the network device, or in response to confirmation of condition change performed at predetermined time intervals.

First, the CPU 101 executes the recovery condition discriminating module of step S501 to determine whether the "sleep level 4" is selected as a setting value for the recovery conditions stored in the NVRAM 105. When the "sleep level 4" is selected (i.e., YES in step S501), the CPU 101 controls the network I/F control section 107 to invalidate all activation commands of the packets received via the network (refer to step S502). The memory 107A of the network I/F control section 107 stores the above nullification settings before this control routine terminates.

On the other hand, when the "sleep level 4" is not selected as a setting value for the recovery conditions stored in the NVRAM 105 (i.e., NO in step S501), the CPU 101 executes the recovery condition discriminating module of step S503 to determine whether the "sleep level 3" is selected as a setting value for the recovery conditions stored in the NVRAM 105. When the setting value "sleep level 3" is stored (i.e., YES in step S503), the CPU 101 controls the network I/F control section 107 to store in its memory 107A the setting data relating to the processing for recovering the network device from the power saving mode only when a start-only packet is received (refer to step S504) before terminating this control procedure.

On the other hand, when the "sleep level 3" is not selected (i.e., NO in step S503), the CPU 101 executes the recovery condition discriminating module of step S505 to determine whether the "sleep level 2" is selected as a setting value for the recovery conditions stored in the NVRAM 105. When the setting value "sleep level 2" is stored (i.e., YES in step S505), the CPU 101 controls the network I/F control section 107 to store in its memory 107A the setting data relating to the processing for recovering the network device from the power saving mode when a start-only packet or an ARP or MAC address packet is received (refer to step S506) before terminating this control procedure, because the recovery conditions corresponding to the "sleep level 2" is dependent on the recovery conditions corresponding to the "sleep level 3".

On the other hand, when the "sleep level 2" is not set as a setting value for the recovery conditions stored in the NVRAM 105 (i.e., NO in step S505), the CPU 101 executes the recovery condition discriminating module of step S507 to determine whether the "sleep level 1" is selected as a setting value for the recovery conditions stored in the NVRAM 105. When the setting value "sleep level 1" is stored (i.e., YES in step S507), the CPU 101 controls the network I/F control section 107 to store in its memory 107A the setting data relating to the processing for recovering the network device from the power saving mode when a start-only packet or an ARP or MAC address packet, or an SLP or SNMP polling packet is received (refer to step S508) before terminating this control procedure, because the recovery conditions corresponding to the "sleep level 1" is dependent on the recovery conditions corresponding to the "sleep level 2" and the "sleep level 3".

On the other hand, when the "sleep level 1" is not set as a setting value for the recovery conditions stored in the NVRAM 105 (i.e., NO in step S507), the CPU 101 terminates this control routine.

With this arrangement, the network device can display sleep levels corresponding to the communication protocol type in a stepwise manner in relation to power saving effects, and a user can select a desirable recovery condition with reference to the displayed sleep levels. Thus, even if a user has no specialized knowledge with respect to the packets or the like, the user can easily customize the network communication function so as to realize a unique recovery to the normal operation mode.

Furthermore, selecting a recovery condition capable of bringing enhanced power saving effects (e.g., no sleep recovery occurs in response to an unnecessary packet) enables the setting of robust power saving conditions that can realize a highly effective power saving.

Fourth Exemplary Embodiment

The above-described exemplary embodiments use the recovery conditions having mutual dependency. Thus, if any recovery condition is selected, it is determined whether the selected recovery condition is dependent on other recovery condition(s). If there is any dependency, other recovery condition(s) are validated. However, in the third exemplary embodiment, it is possible to use recovery conditions having no mutual dependency as described below.

The service menu items "not activated by network packet" cannot be independent from other service menu items. More specifically, if one of the service menu items "activated by start-only packet", "activated by printing job packet", and "activated by utility service packet" is selected, the condition "not activated by network packet" cannot be selected. On the contrary, if the service menu item "not activated by network packet" is selected, other conditions cannot be selected.

On the other hand, the service menu items "activated by start-only packet", "activated by printing job packet" and "activated by utility service packet" can be independent from each other. Thus, the present exemplary embodiment can allow a user to select one of a total of eight options, whereas the above-described exemplary embodiments provide only four options. The user can obtain a more desirable power saving effect.

Fifth Exemplary Embodiment

The first exemplary embodiment uses the operation panel 109 to allow a user to select the conditions for recovering the network device from the power saving mode through the setting screen shown in FIGS. 5 through 8. The memory 107A of the network I/F control section 107 stores the selected setting data.

However, instead of using the operation panel, the network device can execute, in an administrator mode or in a user mode, the utility operable in a client apparatus (i.e., computer apparatus). In this case, in response to a request from the client apparatus, the network device can transmit screen information equivalent to the recovery condition setting screen displayed on the operation panel 109. The CPU 101 can control the network I/F control section 107 to set the selected recovery conditions based on the information returned from the client apparatus.

Sixth Exemplary Embodiment

The first exemplary embodiment uses the operation panel 109 to allow a user to select the conditions for recovering the network device from the power saving mode through the setting screen shown in FIGS. 5 through 8. The memory 107A of the network I/F control section 107 stores the selected setting data. The processing for recovering the network device to a normal operation mode requires identification of the protocol type.

On the other hand, for example, schedule settings can be included in the setting of the conditions for recovering the network device from the power saving mode, so that a user can switch the selection of the recovery conditions at intended timing. For example, frequent printing requests may arise in a specific period of time. In such a case, the recovery conditions can be flexibly switched according to the schedule.

Seventh Exemplary Embodiment

The first and second exemplary embodiment use the operation panel 109 to allow a user to select the conditions for recovering the network device from the power saving mode through the setting screen shown in FIGS. 5 through 8. The memory 107A of the network I/F control section 107 stores the selected setting data.

In each exemplary embodiment, the operation panel 109 can be a type selectable by a user, so that the user (e.g., a user having no specialized knowledge) can easily select a desirable recovery condition on a user's preferred recovery condition selection screen.

Eighth Exemplary Embodiment

The first exemplary embodiment uses the operation panel 109 to allow a user to select the conditions for recovering the network device from the power saving mode through the setting screen shown in FIGS. 5 through 8. The memory 107A of the network I/F control section 107 stores the selected setting data.

However, the operation panel 109 can include a group of plural buttons or the like that can provide a stepwise indication relating to power saving effects in relation to the recovery conditions. When a user pushes one of the buttons, the recovery conditions shown in FIGS. 5 through 8 can be displayed together with the message. The user can push the OK button to fix the selection. With this display control, the user can easily select and set the recovery conditions capable of bringing optimum power saving effects for the network device, while visually confirming power saving effects corresponding to the selected recovery conditions.

Ninth Exemplary Embodiment

The above-described exemplary embodiments directly register the selected recovery conditions in the NVRAM 105 when the recovery conditions are entered through the operation panel 109.

However, the NVRAM 105 can register the selected recovery conditions together with user information or group information. The recovery conditions can be set according to user's preference, or according to the expectation of the group. The burden for the same settings can be reduced. A client apparatus can transmit a command instructing switching of the setting data. The network device can change the recovery conditions in accordance with this command.

Tenth Exemplary Embodiment

According to the above-described exemplary embodiments, if the recovery conditions are changed, the registered recovery conditions can be set in the processing shown in FIG. 10 or 17. In general, when an electric power source is turned on, or immediately after the network device has finished a specific function, the network device tends to receive many printing job requests. Thus, it is preferable to maintain a lower power saving level in such a specific period of time and validate the recovery conditions set by a user after a predetermined time has passed.

Eleventh Exemplary Embodiment

An arrangement of data processing programs readable by the network device in accordance with the present invention will be described with reference to a memory map shown in FIG. 18. FIG. 18 is a view showing the memory map of a storage medium that can store various data processing programs readable by the network device of the present invention.

Although not shown in the drawing, the information storable in the storage medium includes information relating to the management of the program groups stored in the storage medium, such as version information and grogram creator's name, or information depending on the operating system used to read the programs, such as icons used to discriminate the display of the programs.

Furthermore, directories of the storage medium can manage the data belonging to various programs. Furthermore, the storage medium can store installation programs required to install various programs on a computer, or decompression programs required when the programs are compressed.

A host computer can execute the controls shown in FIGS. 3, 9, 10, 16, and 17 when the program(s) can be installed from the outside. In this case, according to the present invention, the information group including the programs can be supplied to the system by means of a storage medium, such as a CD-ROM, a flash memory or a FD, or supplied from an external storage medium via a network.

A storage medium storing the software program(s) realizing the above-described functions of the present exemplary embodiments can be supplied to the system or the apparatus. A computer (or CPU or MPU) of the system or the apparatus can read and execute the supplied program codes to realize the functions of the present exemplary embodiments. In other words, the present invention encompasses the program codes that can realize the functions or processes of the present invention and any storage medium that can store the program codes. In this case, the equivalents of programs can be used if they possess comparable functions. The type of program(s) can be selected from any one of object codes, interpreter programs, and OS script data.

A storage medium supplying the program(s) can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R). Accordingly, when a computer can realize the functions or processes of the present invention, program codes read out from a storage medium storing the programs are means for realizing the present invention.

The method for supplying the program(s) includes accessing a home page on the Internet using the browsing function of a client computer, when the home page allows each user to download the computer programs of the present invention, or compressed files of the programs having automatic installing functions, to a hard disk or other storage medium of the user.

Furthermore, the program codes constituting the programs of the present invention can be divided into a plurality of files so that respective files can be downloaded from different home pages. Namely, the present invention encompasses Internet servers and FTP servers that allow numerous users to download the program files so that the functions or processes of the present invention can be realized on their computers.

Furthermore, enciphering the programs of the present invention and storing the enciphered programs in a CD-ROM or comparable storage medium is a practical method for distributing the programs of the present invention to the numerous users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, based on instruction of the program(s), the operating system running on the computer can execute part or all of the processing so that the functions of the above-described exemplary embodiments can be realized.

Furthermore, the program codes read out of a storage medium can be written into a memory of a feature expansion board equipped in a computer or into a memory of a feature expansion unit connected to the computer. In this case, based on instructions of the program codes, the CPU provided on the feature expansion board or the feature expansion unit can execute part or all of the processing so that the functions of the above-described exemplary embodiments can be realized.

As described above, the present invention can provide a network device (e.g., the network device 202 shown in FIG. 2) that can receive a data packet complying with a predetermined protocol via a network and perform predetermined processing. The network device 202 can set recovery conditions corresponding to the protocol of the received data packet with reference to the table shown in FIG. 4. The network device 202 can recover from a power saving condition according to the recovery conditions (refer to step S104 shown in FIG. 3).

With this arrangement, even if a user has no specialized knowledge with respect to the protocol type or network, the user can easily recover the network device to a normal operation mode by simply selecting one of recovery conditions that are related to network settings to realize a differentiated recovery from the power saving mode. The recovery conditions for recovering the network device from the power saving mode to the normal operation mode can be service menu items corresponding to the data packets (refer to service menu items shown in FIG. 4).

With this arrangement, a user can easily recover the network device to a normal operation mode by simply selecting one of service menu items that are related to network settings to realize a differentiated recovery from the power saving mode. The recovery conditions for recovering the network device from the power saving mode to the normal operation mode can be related to sleep levels. With this arrangement, a user can easily recover the network device to a normal operation mode by simply selecting one of sleep levels that are related to network settings to realize a differentiated recovery from the power saving mode.

The recovery conditions can be displayed on a display section of the network device, so that a user can select a desirable recovery condition from the displayed recovery conditions. With this arrangement, even if a user has no specialized knowledge with respect to the protocol type or network, the user can easily recover the network device to a normal operation mode by simply selecting a desirable recovery condition while confirming the display of selectable recovery conditions that are related to network settings to realize a differentiated recovery from the power saving mode.

The display on the display section can include an indication that visually shows power saving effects in a stepwise manner in relation to respective recovery conditions. With this arrangement, a user can confirm the relationship between the power saving effect and the selected service menu items (i.e., recovery condition). It is possible to selectively display the indication visually showing power saving effects and plural recovery conditions, based on a selected sleep level. With this arrangement, a user can confirm the relationship between the power saving effect and the selected sleep level.

When any recovery condition is selected, the display section of the network device can turn the display of the selected recovery condition and another recovery condition dependent on the selected recovery condition into a selected state. According to the example shown in FIG. 4, the service menu items "activated by printing job packet" is dependent on the service menu items "activated by start-only packet".

With this arrangement, when a user selects any one of recovery conditions related to the power saving mode, not only the selected recovery condition but also a dependent recovery condition can be automatically set. In other words, the user can select a desirable power saving level from plural recovery conditions that are mutually relevant but are differentiated, without causing any contradiction.

A memorizing unit (e.g., NVRAM 105 shown in FIG. 1) can be provided to store the selected recovery condition, so that the recovery condition stored in the memorizing unit can be automatically selected when an electric power source is turned on. With this arrangement, the network device can automatically starts the normal operation upon a turning-on of the electric power source in accordance with the registered recovery condition, even if the recovery condition is changed. Thus, no complicated operation for selecting the recovery conditions is required.

Furthermore, the present invention provides a transferring unit (e.g., the network I/F control section 107 shown in FIG. 1) to transfer screen information to a client apparatus so that the client apparatus can display the recovery conditions to let a user select a desirable recovery condition from the displayed recovery conditions. In addition, the present invention provides a remote registering unit (e.g., the network I/F control section 107 shown in FIG. 1) to register the power saving condition in the memorizing unit when the client apparatus returns selection information relating to a recovery condition selected based on the screen information transferred by the transferring unit. With this arrangement, the network device can select the recovery condition transmitted from a remote client apparatus. Thus, the usability can be improved.

The present invention can provide a method for controlling a network device that can receive a data packet complying with a predetermined protocol via a network and perform predetermined processing. When no request (i.e., various packets) is received for a predetermined time, the operation of the network device is switched from a normal operation mode to a power saving mode (refer to step S101 shown in FIG. 3).

The method includes a setting step of setting recovery conditions corresponding to the protocol of the received data packet (executed by CPU 101 with reference to the table shown in FIG. 4), a selecting step of selecting a desirable recovery condition from the recovery conditions set in the setting step (refer to steps S201 to S214 shown in FIG. 9 and steps S301 to S309 shown in FIG. 10), and a recovering step of recovering the network device from the power saving condition according to the recovery conditions set in the setting step (refer to step S104 shown in FIG. 3).

As described above, the network device of the present exemplary embodiment can display recovery conditions corresponding to the communication protocol type in a stepwise manner in relation to power saving effects, and a user can select a desirable recovery condition with reference to the displayed contents. Thus, even if a user has no specialized knowledge with respect to the packets or the like, the user can easily customize the network communication function so as to realize a unique recovery to the normal operation mode.

Furthermore, selecting a recovery condition capable of bringing enhanced power saving effects (e.g., no sleep recovery occurs in response to an unnecessary packet) enables the setting of robust power saving conditions that can realize a highly effective power saving. Moreover, if a user selects one recovery condition, another recovery condition relating to the selected recovery condition can be displayed together so that the user can visually confirm mutual dependency between the selected and relevant recovery conditions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-90503 filed Mar. 28, 2005 and European Patent Application No. 06251134.0 filed Mar. 2, 2006, which are hereby incorporated by reference herein in its entirety.

What is claimed is:

1. An imaging forming device comprising:
    a receiving unit configured to receive a data packet complying with a predetermined network protocol via a network;
    a setting unit configured to set recovery conditions corresponding to the network protocol of the received data packet; and
    a determining unit configured to determine a kind of network protocol of said received packet;
    a recovering unit configured to recover the image forming device from a power saving condition when the determined kind of network protocol is set as one of the recovery conditions set by the setting unit,
    wherein the recovery conditions are displayed on a display section of the image forming device, and
    wherein the one recovery condition including the determined kind of network protocol can be selected by a user from the displayed recovery conditions.

2. The image forming device according to claim 1, further comprising a selecting unit configured to select a desirable recovery condition from a plurality of recovery conditions, wherein the recovering unit cancels the power saving condition of a predetermined power consuming unit of the image forming device according to the recovery condition selected by the selecting unit.

3. The image forming device according to claim 2, wherein the selecting unit selectively displays an indication showing power saving effects and a plurality of recovery conditions, based on a selected sleep level.

4. The image forming device according to claim 2, wherein when any recovery condition is selected by the selecting unit, a display section of the image forming device turns the display of the selected recovery condition and another recovery condition dependent on the selected recovery condition into a selected state.

5. The image forming device according to claim 2, further comprising a memorizing unit configured to store the recovery condition selected by the selecting unit, wherein the recovery condition stored in the memorizing unit is automatically selected when an electric power source is turned on.

6. The image forming device according to claim 5, further comprising:
    a transferring unit configured to transfer screen information to a client apparatus so that the client apparatus can display the recovery conditions set by the setting unit to let a user select a desirable recovery condition from the displayed recovery conditions; and
    a remote registering unit configured to register the power saving condition in the memorizing unit when the client apparatus returns selection information relating to a recovery condition selected based on the screen information transferred by the transferring unit.

7. The image forming device according to claim 1, wherein the recovery conditions are service menu items corresponding to data packets.

8. The image forming device according to claim 1, wherein the recovery conditions are related to a plurality of sleep levels.

9. The image forming device according to claim 1, wherein when the recovery condition is a packet designating a predetermined retrieval protocol, the recovering unit cancels the power saving condition of a predetermined unit that returns information relating to a device configuration.

10. The image forming device according to claim 1, wherein the recovery conditions include at least one of an option that the power saving condition is not canceled when a network packet is received, an option that the power saving condition is canceled when a start-only packet is received, an option that the power saving condition is canceled when a printing job is received, and an option that the power saving condition is canceled when a packet relating to a retrieval application is received.

11. A method for controlling an image forming device, comprising:
    receiving a data packet complying with a predetermined network protocol via a network;
    setting recovery conditions corresponding to the network protocol of the received data packet;
    determining a kind of the network protocol of the received packet; and
    recovering the image forming device from a power saving condition when the determined kind of the network protocol is set as one of the set recovery conditions,
    wherein the recovery condition are displayed on a display section of the image forming device, and
    wherein the one recovery condition including the determined kind of the network protocol can be selected by a user from the displayed recovery conditions.

12. The control method according to claim 11, further comprising selecting a desirable recovery condition from a plurality of recovery conditions,
    wherein the recovering is performed by canceling the power saving condition of a predetermined power consuming unit of the image forming device according to the selected recovery condition.

13. The control method according to claim 12, wherein the selecting is performed by selectively displaying an indication showing power saving effects and a plurality of recovery conditions, based on a selected sleep level.

14. The control method according to claim 12, wherein when any recovery condition is selected, a display section of the image forming device turns the display of the selected recovery condition and another recovery condition dependent on the selected recovery condition into a selected state.

15. The control method according to claim 12, further comprising memorizing the selected recovery condition, wherein the recovery condition stored in the memorizing step is automatically selected when an electric power source is turned on.

16. The control method according to claim 15, further comprising:
    transferring screen information to a client apparatus so that the client apparatus can display the recovery conditions set in the setting step to let a user select a desirable recovery condition from the displayed recovery conditions; and remotely registering the power saving condition in the memorizing step when the client apparatus returns selection information relating to a recovery condition selected based on the transferred screen information.

17. The control method according to claim 11, wherein the recovery conditions are service menu items corresponding to data packets.

18. The control method according to claim 11, wherein the recovery conditions are related to a plurality of sleep levels.

19. The control method according to claim 11, wherein when the recovery condition is a packet designating a predetermined retrieval protocol, the recovering step is performed by canceling the power saving condition of a predetermined unit that returns information relating to a device configuration.

20. The control method according to claim 11, wherein the recovery conditions include at least one of an option that the power saving condition is not canceled when a network packet is received, an option that the power saving condition is canceled when a start-only packet is received, an option that the power saving condition is canceled when a printing job is received, and an option that the power saving condition is canceled when a packet relating to a retrieval application is received.

21. A computer-readable storage medium containing computer-executable instructions for controlling an imaging forming device, the medium comprising:

computer-executable instructions for receiving a data packet complying with a predetermined network protocol via a network;

computer-executable instructions for setting recovery conditions corresponding to the network protocol of the received data packet; and computer-executable instructions for determining a kind of the network protocol of the received packet;

computer-executable instructions for recovering the image forming device from a power saving condition when the determined kind of network protocol is set as one of the recovery conditions, wherein the recovery conditions are displayed on a display section of the image forming device, and wherein the one recovery condition including the determined kind of network protocol can be selected by a user from the displayed recovery conditions.

* * * * *